Figures 1, 2:
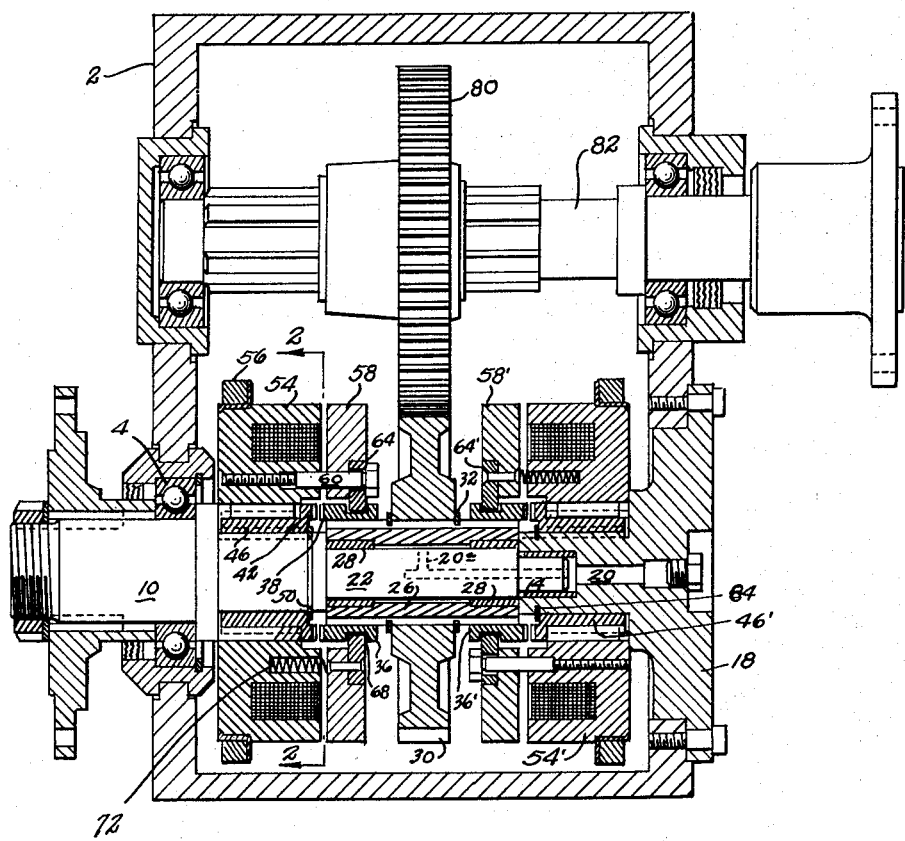

Nov. 29, 1960  H. W. STRAUB  2,962,139
SOLENOID OPERATED CLUTCH-BRAKE DEVICE
Filed Oct. 14, 1955

INVENTOR.
HERMANN W. STRAUB,
BY Parry & Gier
ATTORNEYS

# 2,962,139
SOLENOID OPERATED CLUTCH-BRAKE DEVICE

Hermann W. Straub, Friedrichshafen, Germany, assignor to I-T-E Circuit Breaker Company, Philadelphia, Pa., a corporation of Pennsylvania Filed Oct. 14, 1955, Ser. No. 540,568

Claims priority, application Germany Apr. 23, 1955

3 Claims. (Cl. 192—18)

This invention relates to electromagnetic clutches and more particularly to a combination clutch and brake.

It is an object of the invention to provide a combination clutch-brake having parts with small angular moment of inertia.

It is another object of the invention to provide a solenoid operated clutch-brake wherein the teeth of the clutch and brake components are arranged in substantially small circles to minimize their linear velocity as well as the flywheel effect of rotational masses to effect rapid control of cutting elements in a machine tool.

Additional objects and features of the invention will become apparent from the appended drawing in which:

Fig. 1 is an elevation in cross-section taken through a clutch constructed in accordance with the invention, and Fig. 2 is a section through 2—2 of Fig. 1.

Briefly, my novel construction comprises the utilization of clutch teeth radially arranged on the faces of clutch rings rather than peripherally arranged as heretofore found in the prior art. The radial arrangement permits of design of a clutch ring having small diameter and lessened flywheel effect. My invention also contemplates the use of substantially small rotational parts which may be readily assembled into a compact and economical structure.

Referring now to the drawing, the invention comprises a casing 2 having a bearing 4 which supports a driving shaft 10. Driving shaft 10 has a turned-down portion 14 at its end which portion is supported in a fixed journal or bearing 18 suitably bolted to the casing. A lubrication passage 20 feeds through the bearing element 18 for a substantial distance into the shaft 10 for the purpose of lubricating the exterior surface of the turned down portion 22 of shaft 10. Thus, a duct 20a leads from passage 20 for this purpose. Carried on the shaft portion 22 is a collar 26, there being intermediate bearings 28 on which sleeve 26 is mounted. A gear 30 is splined to the sleeve 26 and held in place thereon by lock rings 32 which may be set in slots in the splines, as shown. Likewise splined on sleeve 26, being slidable thereon, is a clutch ring 36 having clutch teeth 38 engageable with teeth 42 of a second clutch ring 46 splined to shaft 10 and held in position with respect thereto by a locking ring 50. Slidably splined on the clutch ring 46 is a cylindrical solenoid 54 having the conductive slip-ring 56. It will be understood that current may be conducted to the solenoid through the slip-ring in a well known manner, return being through ground. Thus solenoid 54 is rotative with shaft 10 and may be fixed thereto or slightly slidable with relation thereto without affecting the clutch function. An armature 58 is carried by the solenoid by means of bolts such as 60 angularly spaced. The armature can slide on the bolts toward the solenoid face when the solenoid is energized. The bolts 60 secure a split-ring 64 to the armature, the halves of which ring engage in a groove 68 of clutch ring 36. Thus, the solenoid, the armature, and both clutch rings form an integral unit which may be readily removed or assembled. A plurality of springs 72 are socketed within the solenoid body and press outwardly against the armature in order to maintain the clutch rings disengaged. It will be apparent that when the solenoid is energized the armature is drawn thereto to engage the clutch rings. When the clutch rings are thus engaged, rotation of sleeve 26 is effected which effects rotations of the gear 30. Rotation of gear 30 effects rotation of a gear 80 suitably carried on shaft 82, this being the driven shaft. Accordingly, power from the shaft 10 may be transmitted to shaft 82 as described above.

The construction of the drive for purposes of serving as a positive brake is identical with the elements utilized for the clutch except as will be noted. Thus, like parts are marked with primed reference characters, there being a solenoid 54', a pair of brake or tooth rings 36' and 46', an armature 58', etc. In this instance, however, the solenoid 54' is not rotary nor is the ring 46' to which it is splined. These two elements are stationary and carried by a collar which is integral with the bearing element 18, as shown. A locking ring 84 is utilized to hold the assembly on the bearing element 18.

Armature 58' is likewise non-rotary. However, the clutch ring 36' rotates with the driving shaft 10. Accordingly, when it is desired to brake the machine, energization of solenoid 54' will attract the armature 58' so as as to bring ring 36' into engagement with ring 46' and, the latter being stationary, sleeve 26 and thus shaft 82 will be stopped, although driving shaft 10 will continue to rotate.

I claim:

1. In a combination clutch and brake, a driving shaft, a cylindrical solenoid carried by said driving shaft and rotative therewith, an armature carried by said solenoid and movable thereto when said solenoid is energized, a driving clutch ring rotative with said solenoid and said shaft; said driving clutch ring being completely disposed interiorly of said solenoid, a driven clutch ring rotative relative said armature and reciprocal therewith, whereby when said solenoid is energized said clutch rings are engaged; said clutch rings being provided with complementarily engaging teeth disposed radially on opposing faces thereof.

2. In a combination electro magnetically operating clutch and brake, a drive shaft, a clutch ring mounted on said drive shaft and rotative therewith, a solenoid body completely concentrically surrounding said clutch ring and keyed thereto so as to be rotative with said driving shaft, an armature, a second clutch ring engageable with said first clutch ring and actuated by said armature into engagement when said solenoid is energized, a sleeve, said second clutch ring being carried on said sleeve and slidably splined thereto, whereby said sleeve may be rotated under power when said solenoid is energized, a brake ring carried by said sleeve and being rotative therewith and slidably splined thereto, an armature for actuating said brake ring and being rotatably secured thereto, a brake solenoid, said armature being slidably carried by said brake solenoid, a non-rotative brake ring engageable with said first mentioned brake ring, said brake solenoid being said non-rotative brake ring.

3. A device as set forth in claim 2 wherein said sleeve is rotatively supported on said driving shaft including power take-off means carried by said sleeve intermediate said rotative clutch ring and said rotative brake ring.

References Cited in the file of this patent

UNITED STATES PATENTS

| | | |
|---|---|---|
| 1,229,984 | Libby | June 12, 1917 |
| 1,756,907 | Payne | Apr. 29, 1930 |
| 1,891,982 | Hodgson | Dec. 27, 1932 |
| 1,989,984 | Hope | Feb. 5, 1935 |
| 2,421,757 | Oetzel | June 10, 1947 |
| 2,705,058 | Harter | Mar. 29, 1955 |
| 2,710,359 | Nixon | June 7, 1955 |

FOREIGN PATENTS

| | | |
|---|---|---|
| 4,718 | Great Britain | Mar. 26, 1915 |